Patented Sept. 13, 1949

2,481,641

UNITED STATES PATENT OFFICE 2,481,641

NONACID ACTIVATION PROCESS FOR BLEACHING CLAY

Ernest C. Bierce, Pasadena, Calif.

No Drawing. Application September 16, 1946,
Serial No. 697,382

3 Claims. (Cl. 252—457)

This invention relates to the activation of bleaching clay for decolorizing and refining oils and for use as a catalyst.

Naturally occurring clays have long been used for decolorizing and adsorption, and as catalysts and it is well known that many kinds of clay both naturally active and inactive are improved and activated by treatments with mineral acids under varying conditions of processing.

One object of my invention is to provide a nonacid activation process for bleaching clay. Another object is to provide a process for treating bleaching clays which gives greater yields and at lower costs than the acid activation process for clays. A further object is to provide clays which are more effective in decolorizing, selective adsorption and as catalysts, and having free filtering and low retention of liquid in a filter cake. Still another object is to provide an activated clay product whose particles are coated with highly activated magnesium silicate.

I have found, in general, that superior bleaching clay products result from the treatment of activatable clay material by a process consisting first of boiling the clay in dilute sodium silicate solution and then adding to the mixture a soluble magnesium salt such as magnesium chloride, thereby producing a bleaching clay product which consists of activated clay residue particles coated with and also intimately mixed with aluminum and magnesium compounds, particularly magnesium silicate, in a highly active form for use when dried in decolorizing and refining oils. The process may be varied by the use of an intermediary step in which calcium silicate compounds are first formed in the pulp following the activation and partial decomposition of the raw clay by boiling with sodium silicate solution, and then subsequently converting the calcium compounds to the magnesium compounds by a base-exchange treatment with magnesium chloride solution.

Illustrating my preferred process, one part of decolorizing clay ground or pulverized to 200 mesh and finer was made into a pulp with about 3 parts by weight of dilute aqueous sodium silicate solution. The amount of sodium silicate is on the average about .5 part of liquid sodium silicate ($1Na_2O:3.22SiO_2$) of 40° Beaumé. The pulp, consisting of the finely ground clay and the diluted sodium silicate solution was heated to boiling and held at that temperature for about 2 hours following which a solution of magnesium chloride consisting of about .25 part by weight of magnesium chloride (anhydrous basis) in .75 part by weight of water. The mixture was then boiled for an additional 2 hours and the resulting mixture was diluted with water. The soluble salts were washed out and the solid material collected and dried. The product of the above illustrative process has equal or better decolorizing properties than the commercially available acid-treated clays and in addition, the speed of filtration of the liquids being decolorized through the clay is greatly improved. The amount of oil retained by my activated clay following filtration for decolorizing is considerably less than is commanly encountered with other decolorizing clays.

The reaction which is believed to take place when the clay is boiled with sodium silicate solution results in the formation of insoluble hydrated amorphous silica and sodium hydroxide in solution. The sodium hydroxide solution then attacks the clay causing some disintegration of the clay molecule and the formation of aluminate and silicate products. Upon the addition of the magnesium chloride, it is believed that a highly active form of magnesium silicate in non-crystalline and probably hydrated gelatinous condition is produced as a coating on the clay particle residue, as well as in separate particles intermingled with the coated clay residue particles.

Illustrating the alternative process in which the calcium compounds are first formed, I have treated a raw filtering clay, as above described in the preferred illustrative example, with about 3 times its weight of a dilute solution of sodium silicate. After boiling the pulp for about 2 hours, a solution of calcium chloride consisting of about .3 part by weight of calcium chloride (anhydrous basis) in .7 part by weight of water, may be added and the pulp cooked for an additional 4 hours, following which the solids including the clay residue with the insoluble calcium compounds are separated from the soluble salts, and washed until substantially free from soluble salts. The wet mixture is then treated with magnesium chloride solution equal in amount to about fifty percent of the weight of liquid sodium silicate $$(1Na_2O:3.22SiO_2)$$

of about 40° Beaumé, which was used in the initial cooking. The magnesium is readily exchanged with the calcium, by the well known process of base exchange forming soluble calcium chloride and insoluble magnesium silicates. The soluble salts are washed out, and the activated clay residue, with the magnesium silicate and other insoluble compounds is dried and ready for use in decolorizing and treating oils and the like.

The amount of sodium silicate to be used in my process may be varied over a wide range and when larger amounts are used, the free filtering characteristic of the activated clay product is improved, and at the same time, the amount of oil which is adsorbed in the filter cake when the clay is used for decolorizing oil is greatly reduced. In the above illustrative experiment, I have used an amount of sodium silicate equal to about one-half the weight of clay and after treatment with magnesium chloride as described produced a product which has high decolorizing power and contains an appreciable amount of compounds derived from the sodium aluminate which are advantageous particularly in treating vegetable oils in reducing the free fatty acid content. When the amount of sodium silicate is increased up to about 3 times the weight of raw clay involved, the finished product, after the reaction with the magnesium chloride, is much faster in filtration rate and much lower in oil retention in the filter cake.

When the sodium silicate added to the pulp is more than will react with the clay, it is desirable after the boiling to precipitate hydrated amorphous silica from any excess sodium silicate. This modification of my process may be effected by the addition of any suitable reagent adapted to precipitate hydrated amorphous silica from a soluble silicate, such as hydrochloric and sulfuric acid, chlorine gas, carbon dioxide gas, sulfur dioxide gas or acid salts, until the pulp is nearly neutral but still on the alkaline side. The soluble salts are then preferably washed out, and the previously described magnesium chloride solution treatment made on the re-pulped insoluble material containing the activated clay with the excess of hydrated amorphous silica. This variation of my process gives a material having a higher proportion of active magnesium silicate, which results in a final product having decolorizing and free flowing characteristics equal or superior to the best presently marketed acid-treated clays of the free filtering variety.

Hydrated amorphous silica produced from any source may be reacted in a pulp alone or mixed with an activated clay with soluble magnesium salt solution, to give, after washing out the soluble salts and drying, a decolorizing product which has superior properties for decolorizing and refining oils.

The amount of magnesium chloride or other soluble magnesium salt should be sufficient to react with the reactive products formed by the interaction of the selected amount of sodium silicate and the particular variety of raw clay. An excess of the soluble magnesium salt is merely wasted.

The amount of water used in my process is not critical but should be adjusted to give a fluid pulp to facilitate boiling and handling.

The soluble salts may be washed out of the final product and the product collected by any suitable equipment, for example, a Dorr counter-current decantation apparatus, or the like, and the collected product may be dried in a rotary dryer and broken up into a fine dry powder for use.

One advantage of my process of treating bleaching clay is that it may be carried out in inexpensive wooden or steel tanks and does not require the use of acid-proof equipment which is necessary in the older clay treating processes. A further advantage is the fact that there is recovered a weight of product slightly more than the weight of the raw clay being treated, whereas in the acid treating process there is always involved a loss of 15 to 30 percent of the weight of the clay due to the dissolving out of portions of the clay by the acid. It will thus be apparent that my process is more economical because it utilizes the entire amount or substantially the original amount of raw bleaching clay.

The product of my process is an intimate mixture of activated clay particles which have been coated and intermingled with highly active forms of magnesium silicate compounds which constitutes a decolorizing and adsorbent product characterized by high filtering rate and low liquid retention in the filter cake.

I claim:

1. The process of activating bleaching clays comprising heating to boiling a pulp of finely divided bleaching clay in an aqueous solution of sodium silicate, heating the aqueous sodium silicate treated clay mixture with an aqueous solution of calcium chloride, separating out and washing the water insoluble calcium compounds and clay residue, treating the insoluble calcium compounds and clay residue with magnesium chloride aqueous solution to form insoluble magnesium compounds, and separating out the insoluble magnesium compounds and clay residue.

2. The process of activating bleaching clays comprising heating a pulp of finely divided clay in an aqueous solution of sodium silicate, adding an acid reagent to precipitate hydrated amorphous silica, heating the treated clay mixture with an aqueous solution of calcium chloride, separating out and washing the water insoluble compounds and clay residue, treating the water insoluble calcium compounds and clay residue with magnesium chloride aqueous solution containing magnesium in equivalent amount to the calcium in said compounds to form insoluble magnesium compounds, and separating out the insoluble magnesium compounds and clay residue.

3. The process of activating bleaching clays comprising heating a pulp of finely divided clay in an aqueous solution of sodium silicate containing an excess of sodium silicate over that which reacts with the clay, precipitating hydrated amorphous silica by adding an acid reagent, separating out and washing the water insoluble compounds and clay residue, treating the insoluble compounds to form insoluble magnesium compounds and clay residue with magnesium chloride aqueous solution, and separating out the insoluble magnesium compounds and the clay residue.

ERNEST C. BIERCE.

REFERENCES CITED

The following references are of record in the file of this patent:

UNITED STATES PATENTS

| Number | Name | Date |
|---|---|---|
| 1,873,296 | Cross | Aug. 23, 1932 |
| 1,945,534 | Rembert | Feb. 6, 1934 |
| 2,163,525 | Caldwell | June 20, 1939 |
| 2,434,418 | La Lande | Jan. 13, 1948 |